(12) United States Patent
Lin et al.

(10) Patent No.: US 11,752,798 B2
(45) Date of Patent: Sep. 12, 2023

(54) MEASURING AND DRAWING DEVICE

(71) Applicant: Minnan Normal University, Zhangzhou (CN)

(72) Inventors: Xuecong Lin, Zhangzhou (CN); Xiaoqun Wang, Zhangzhou (CN); Anqi Wu, Zhangzhou (CN); Min Wu, Zhangzhou (CN); Ling Xu, Zhangzhou (CN)

(73) Assignee: Minnan Normal University, Fujian (CN)

( * ) Notice: Subject to any disclaimer, the term of this patent is extended or adjusted under 35 U.S.C. 154(b) by 0 days.

(21) Appl. No.: 17/747,334

(22) Filed: May 18, 2022

(65) Prior Publication Data

US 2022/0371358 A1 Nov. 24, 2022

(30) Foreign Application Priority Data

May 18, 2021 (CN) .......................... 202110542756.9

(51) Int. Cl.
| | | |
|---|---|---|
| *B43L 13/00* | (2006.01) | |
| *G01B 21/16* | (2006.01) | |
| *G01B 21/22* | (2006.01) | |
| *G01C 15/00* | (2006.01) | |

(52) U.S. Cl.
CPC .............. *B43L 13/00* (2013.01); *G01B 21/16* (2013.01); *G01B 21/22* (2013.01); *G01C 15/002* (2013.01)

(58) Field of Classification Search
None
See application file for complete search history.

(56) References Cited

U.S. PATENT DOCUMENTS

| | | | | |
|---|---|---|---|---|
| 4,174,572 A | * | 11/1979 | Mikulin .................. | B43L 11/04 33/31 |
| 4,318,225 A | * | 3/1982 | Jenkinson ................ | G01B 7/30 33/1 PT |
| 4,445,275 A | * | 5/1984 | Dubrow ................... | B25H 7/02 33/30.1 |
| 4,580,345 A | * | 4/1986 | Andrew ................. | B25H 7/005 33/21.3 |
| 5,396,709 A | * | 3/1995 | Swan, Jr. ............... | G01C 17/38 33/356 |
| 2022/0371358 A1 | * | 11/2022 | Lin ........................ | B43L 13/022 |

* cited by examiner

*Primary Examiner* — Yaritza Guadalupe-McCall
(74) *Attorney, Agent, or Firm* — COOPER LEGAL GROUP, LLC (57) ABSTRACT

The present disclosure discloses a measuring and drawing device. The measuring and drawing device comprises a supporting frame, a rotation driving portion, a reciprocation driving portion, a drawing member, a distance measuring sensor, an angle sensor, and a control module. A first motor is configured to drive the rotating arm to rotate relative to the supporting frame, and a second motor is configured to drive the drawing member to reciprocate along the rotating arm to enable the drawing member to move in two dimensions. The distance between the first motor and the drawing member is measured through the distance measuring sensor to achieve measuring of a length of a line segment, and the rotating angle of the rotating arm relative to the first motor is measured through the angle sensor to achieve measuring of the rotating angle.

9 Claims, 7 Drawing Sheets

MEASURING AND DRAWING DEVICE

RELATED APPLICATIONS

This application claims priority to Chinese patent application number 202110542756.9, filed on May 18, 2021. Chinese patent application number 202110542756.9 is incorporated herein by reference.

FIELD OF THE DISCLOSURE

The present disclosure relates to a measuring and drawing device.

BACKGROUND OF THE DISCLOSURE

The traditional stationery items of students for measuring and drawing comprises pens, rulers, angle rulers, protractors, compasses, and the like. Each of the traditional stationery items only has a single function and needs to be used in coordination with one another, which is relatively complicated to operate, time-consuming and laborious, and has poor drawing efficiency. Furthermore, there are measuring error and human error in the measurement process. Consequently, how to reduce measuring and drawing complexity, improve measuring and drawing efficiency, and reduce measuring and drawing error has become a difficult problem.

BRIEF SUMMARY OF THE DISCLOSURE

The present disclosure provides a measuring and drawing device to solve the deficiencies in the background.

In order to solve the technical problem, a technical solution of the present disclosure is as follows.

A measuring and drawing device comprises a supporting frame, a rotation driving portion, a reciprocation driving portion, a drawing member, a first laser generator, a second laser generator, a distance measuring sensor, an angle sensor, and a control module. The rotation driving portion comprises a first motor and a rotating arm, the first motor is disposed on the supporting frame, and the first motor is configured to drive the rotating arm to rotate relative to the supporting frame. The reciprocation driving portion is disposed on the rotating arm and comprises a second motor and a belt gear pair, and the second motor is operatively coupled to a gear belt of the belt gear pair. The drawing member is disposed on the gear belt and is configured to reciprocate along a length direction of the rotating arm, and a drawing point of the drawing member is retractable. The first laser generator is disposed at a center of an axis of an output shaft of the first motor, and the second laser generator is disposed on the drawing member. The distance measuring sensor is fixedly disposed relative to the output shaft of the first motor and is configured to measure a distance between the output shaft of the first motor and the drawing member. The angle sensor comprises an emitter and a receiver, the emitter is disposed on the rotating arm, and the receiver is fixedly disposed relative to the output shaft of the first motor and is configured to sense a rotating angle of the rotating arm. Each of the distance measuring sensor and the angle sensor is connected to the control module. The control module is connected to and is configured to control each of the first motor, the second motor, the first laser generator, and the second laser generator. The control module is configured to control the drawing point of the drawing member to extend out of or retract back into the drawing member through an electromagnet. The control module is configured to control each of the first laser generator and the second laser generator to emit a light spot and control the first motor and second motor to work. When a position of the light spot of the second laser generator is confirmed, the measuring and drawing device is configured to perform distance measuring through the distance measuring sensor and perform angle sensing through the angle sensor, and the drawing point of the drawing member is configured to be controlled to extend out of the drawing member to perform drawing of a straight line and a curve.

In a preferred embodiment, the supporting frame comprises a mounting seat and at least three supporting legs configured to be accommodated in the mounting seat in a retractable manner.

In a preferred embodiment, the rotating arm is detachable relative to the output shaft of the first motor.

In a preferred embodiment, the reciprocation driving portion further comprises a guiding mechanism, and the guiding mechanism comprises a guiding gear and a rack. The rack is disposed on the rotating arm along the length direction of the rotating arm, the guiding gear is disposed on the drawing member, and the guiding gear is configured to move on the rack.

In a preferred embodiment, the belt gear pair comprises a driving gear and a driven gear which are disposed at two ends of the rotating arm, the gear belt is tensioned between the driving gear and the driven gear, and the second motor is connected to the driving gear to drive the driven gear.

In a preferred embodiment, the measuring and drawing device comprises a remote control touch screen, and the remote control touch screen is in wireless communication with the control module.

In a preferred embodiment, the remote control touch screen is a mobile phone or a tablet.

In a preferred embodiment, the remote control touch screen is in wireless communication with the control module through Bluetooth or WiFi.

Compared with the existing techniques, the technical solution has the following advantages.

1. The first motor drives the rotating arm to rotate, and the second motor drives the drawing member to reciprocate along the length direction of the rotating arm, so that the drawing member can move in two dimensions and can finish drawing straight lines and curves. The distance between the first motor and the drawing member is measured through the distance measuring sensor to achieve measuring of a length of a line segment, and the rotating angle of the rotating arm relative to the first motor is measured through the angle sensor to achieve measuring of the rotating angle. The first laser generator and the second laser generator achieve alignment of the light points. The present disclosure can complete measuring and drawing without adopting various measuring and drawing stationeries, thereby reducing the measuring and drawing complexity. The drawing member is driven through the first motor and the second motor to dispense with manual operation of the drawing member to achieve measuring and drawing, which improves the drawing efficiency. A moving trajectory of the drawing member is accurately controlled by the control module through rotation of the first motor and the second motor, which improves measuring and drawing accuracy and reduces the measuring and drawing error.

2. The supporting frame comprises the mounting seat and at least three supporting legs. The at least three supporting legs can be accommodated, which makes the measuring and drawing device convenient to store.

3. The first motor is detachably connected to the rotating arm, which makes the measuring and drawing device convenient to store and use.

4. The guiding mechanism can improve moving stability of the drawing member.

5. The remote control touch screen can achieve remote controlling.

DETAILED DESCRIPTION OF THE EMBODIMENTS

The present disclosure will be further described below in combination with the accompanying drawings and embodiments.

In an embodiment, referring to FIGS. 1 to 6, a measuring and drawing device of the present disclosure comprises a supporting frame 1, a rotation driving portion, a reciprocation driving portion, a drawing member 4, a control module, and a remote control touch screen 8.

Figure 5:
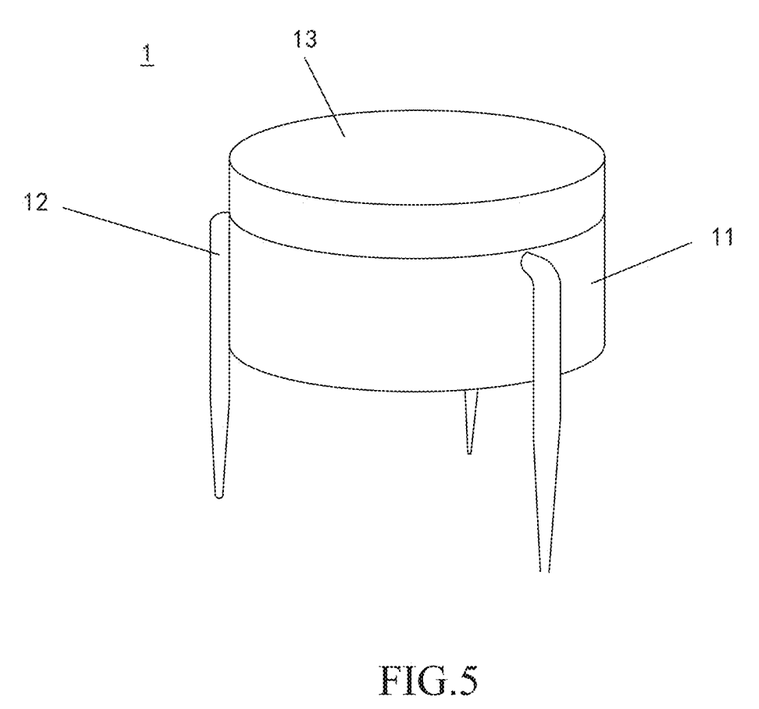
FIG. 5 illustrates a perspective view of a supporting frame of a preferred embodiment in the present disclosure when the supporting frame is in a stored state.

The supporting frame 1 comprises a mounting seat 11 and three supporting legs 12, and the three supporting legs 12 can be accommodated in the mounting seat 11 in a retractable manner. Referring to FIG. 5, a battery compartment 13 for providing power to circuits is disposed on the mounting seat 11.

Figure 1:
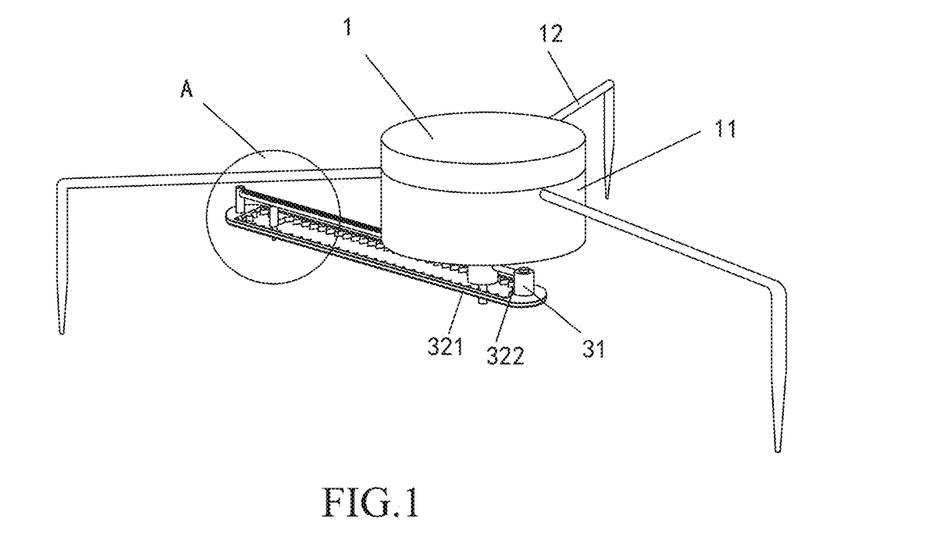
FIG. 1 illustrates a perspective view of a measuring and drawing device of a preferred embodiment in the present disclosure.
Figure 3:
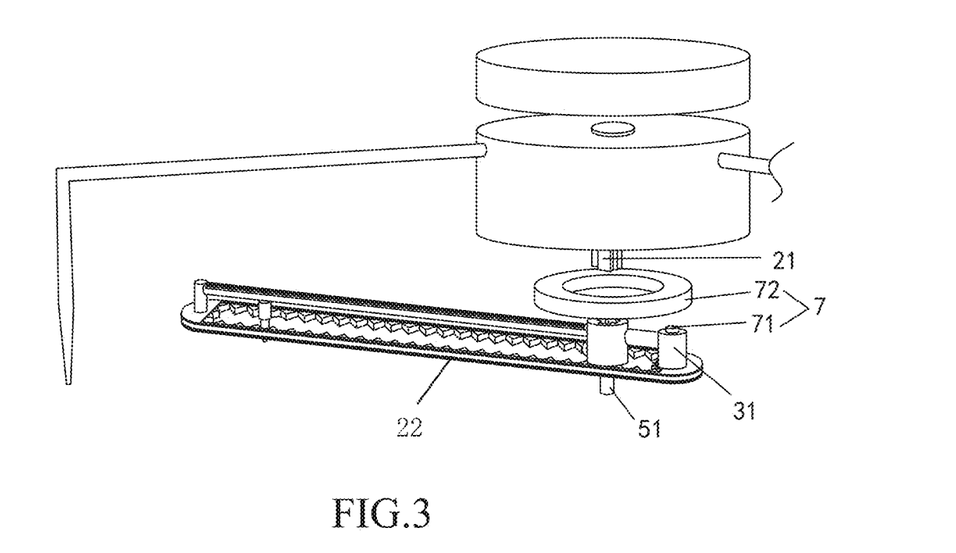
FIG. 3 illustrates an exploded view of the measuring and drawing device of a preferred embodiment in the present disclosure.
Figure 4:
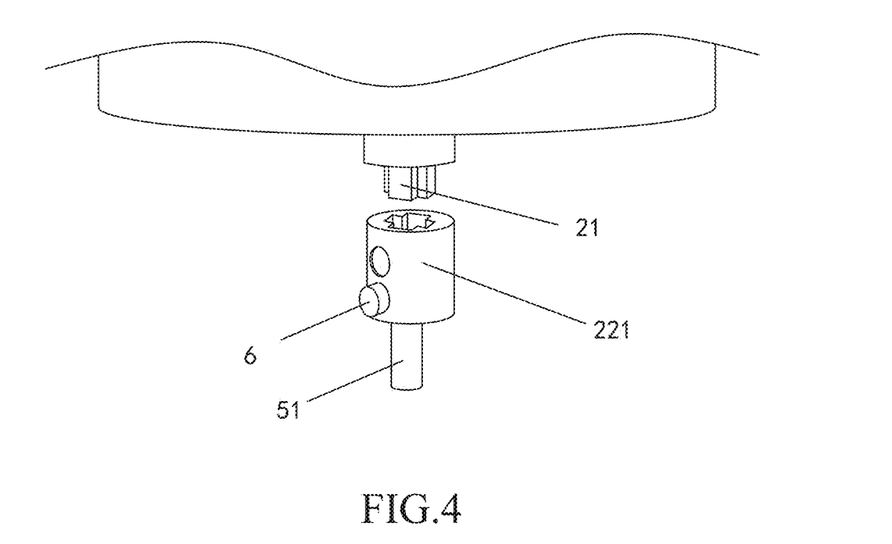
FIG. 4 illustrates an exploded view of an output shaft of a first motor and a shaft seat of a preferred embodiment in the present disclosure.

The rotation driving portion comprises a first motor and a rotating arm 22. The first motor is disposed on the mounting seat 11 of the supporting frame 1, and an output shaft 21 of the first motor extends downward from the mounting seat 11. A shaft seat 221 is disposed on the rotating arm 22, and the output shaft 21 of the first motor is detachably connected in the shaft seat 221. The first motor can drive the rotating arm 22 to rotate relative to the mounting seat 11.

Figure 2:
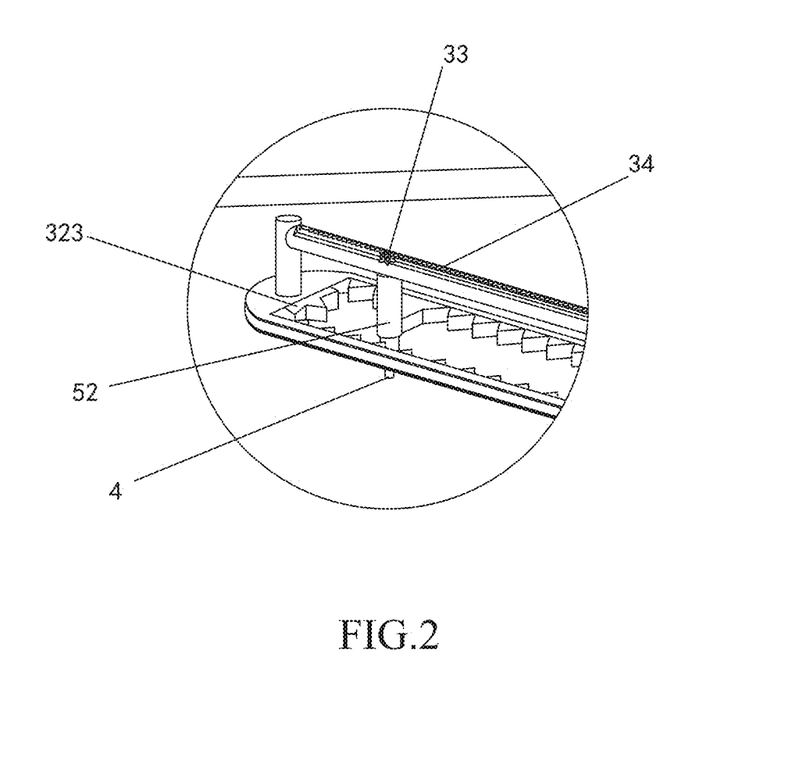
FIG. 2 illustrates an enlarged perspective view of an encircled portion A in FIG. 1 of a preferred embodiment in the present disclosure.

The reciprocation driving portion is disposed on the rotating arm 22 and comprises a second motor 31, a belt gear pair, and a guiding mechanism. The belt gear pair comprises a gear belt 321, a driving gear 322, and a driven gear 323. The driving gear 322 and the driven gear 323 are respectively disposed at two ends of the rotating arm 22, and the gear belt 321 is tensioned between the driving gear 322 and the driven gear 323. The second motor 31 is in driving connection with the driving gear 322. The drawing member 4 is disposed on the gear belt 321 and is configured to reciprocate along a length direction of the rotating arm 22 due to driving of the second motor 31. The guiding mechanism comprises a guiding gear 33 and a rack 34. The rack 34 is disposed on the rotating arm 22 along the length direction of the rotating arm 22, and the guiding gear 33 is disposed on the drawing member 4. During reciprocating of the drawing member 4, the guiding gear 33 moves on the rack 34.

A first laser generator 51 is disposed at a center of an axis of the output shaft 21 of the first motor, a second laser generator 52 is disposed on the drawing member 4, and each of the first laser generator 51 and the second laser generator 52 can emit laser beams downwards.

The measuring and drawing device of this embodiment further comprises a distance measuring sensor 6 and an angle sensor 7. The distance measuring sensor 6 is fixedly disposed on the output shaft 21 of the first motor and faces the drawing member 4 to measure a distance between the output shaft 21 of the first motor and the drawing member 4. Referring to FIG. 3, the angle sensor 7 comprises an emitter 71 and a receiver 72, and the emitter 71 is disposed on the rotating arm 22. Specifically, the emitter 71 is disposed on the second motor 31, and the receiver 72 is disposed on a periphery of the output shaft 21 of the first motor to sense a rotating angle of the rotating arm 22.

Furthermore, a drawing point of the drawing member 4 of this embodiment can be controlled by an electromagnet to extend out of or retract back into the drawing member 4. Only when the drawing member 4 is needed to be used, will the drawing point extend out for use.

Figure 11:
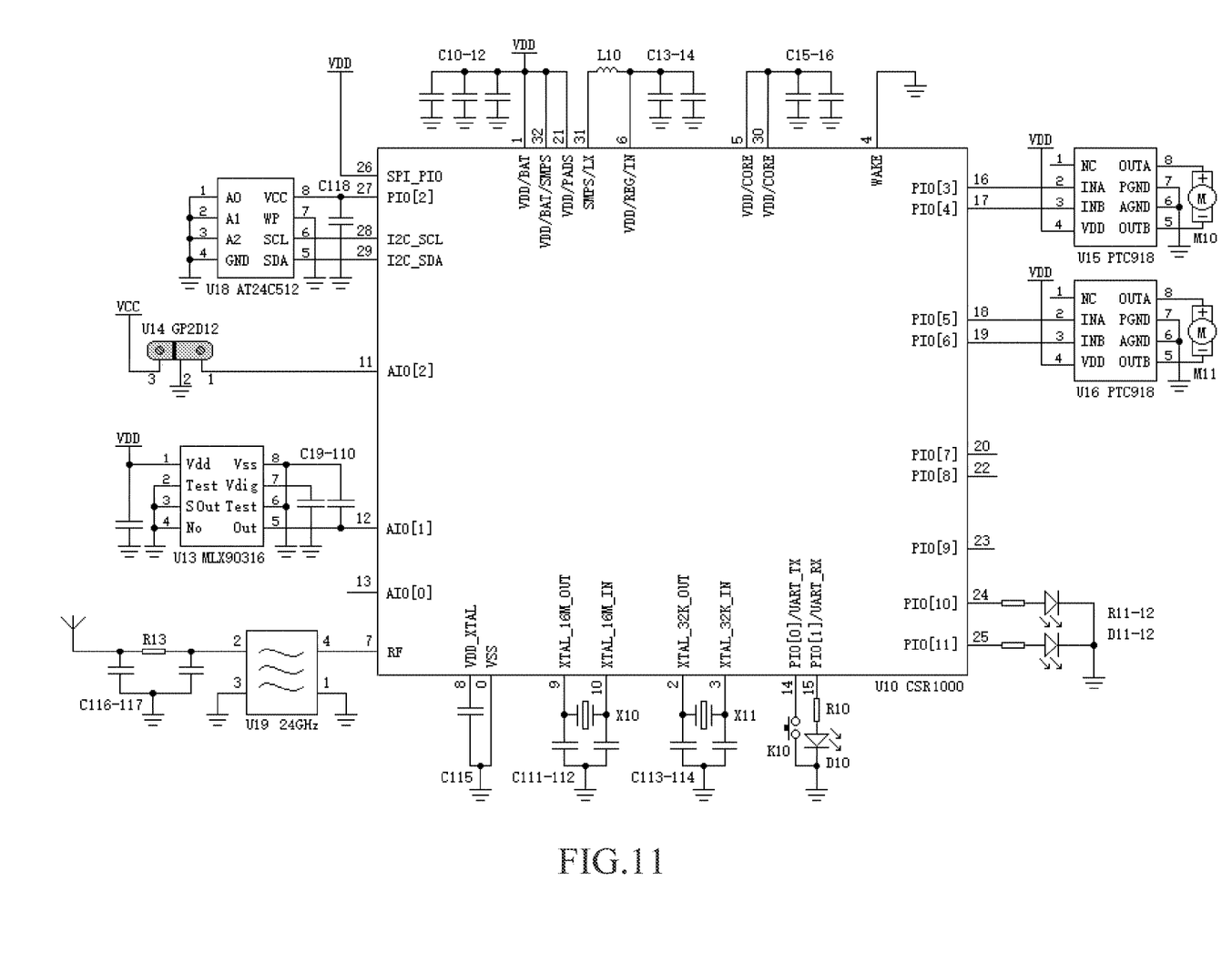
FIG. 11 illustrates a schematic circuit diagram of a control module of a preferred embodiment in the present disclosure.
Figure 12:
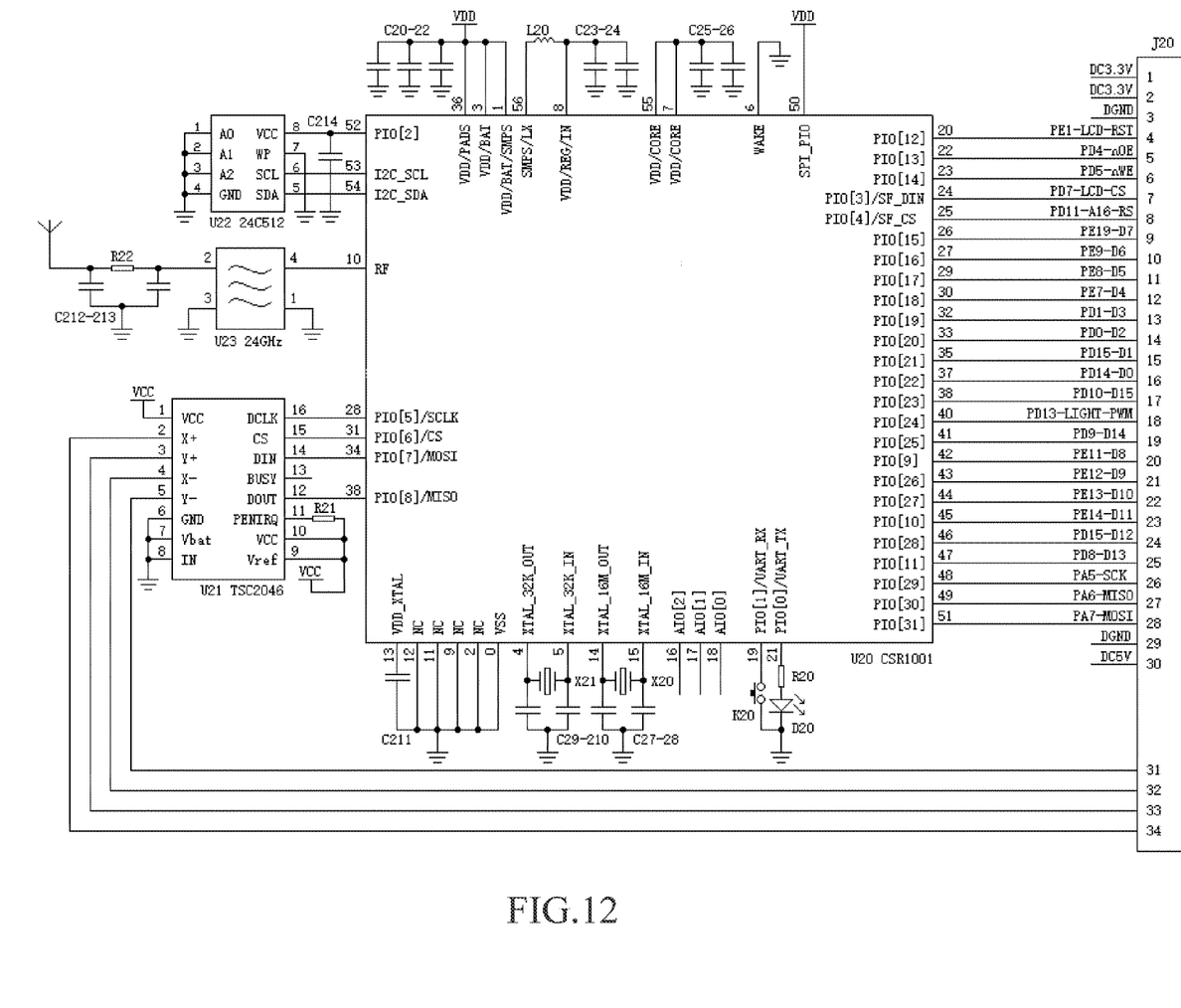
FIG. 12 illustrates a schematic circuit diagram of the remote control touch screen of a preferred embodiment in the present disclosure.

A circuit control portion of this embodiment is described with reference to circuits illustrated in FIGS. 11 to 12. Each of the distance measuring sensor 6 (U14) and the angle sensor 7 (U13) is connected to a control chip U10 (i.e., the control module). The control chip U10 is a Bluetooth chip and is in Bluetooth communication with a control chip U20 of the remote control touch screen 8 illustrated in FIG. 12. The control chip U10 is connected to and controls each of the first motor (M10), the second motor 31 (M11), the first laser generator 51 and the second laser generator 52, and the control module further controls the drawing point of the drawing member 4 to extend out of or retract back into the drawing member 4 through the electromagnet.

In this embodiment, the control module controls each of the first laser generator 51 and the second laser generator 52 to emit a light spot and controls the first motor and the second motor 31 to work. When a position of the light spot of the second laser generator 52 is determined, the distance measuring sensor 6 is configured to measure the distance between the output shaft 21 of the first motor and the drawing member 4, the angle sensor 7 is configured to sense the rotating angle of the rotating arm 22, and the control module is configured to control the drawing point of the drawing member 4 to extend out of the drawing member 4 to perform linear and curved drawings.

The remote control touch screen 8 of this embodiment may also directly adopt a smart device such as a mobile phone or a tablet and install a corresponding application program on the mobile phone or the tablet.

A use method of this embodiment is as follows: the output shaft 21 of first motor is inserted into the shaft seat 221 of the rotating arm 22, the three supporting legs 12 are opened to be placed on a work plane, the remote control touch screen 8 is made to be in Bluetooth communication with the measuring and drawing device, and the remote control touch screen 8 can perform remote controlling after connecting successfully.

A working principle of this embodiment for realizing a drawing function is as follows.

Figure 6:
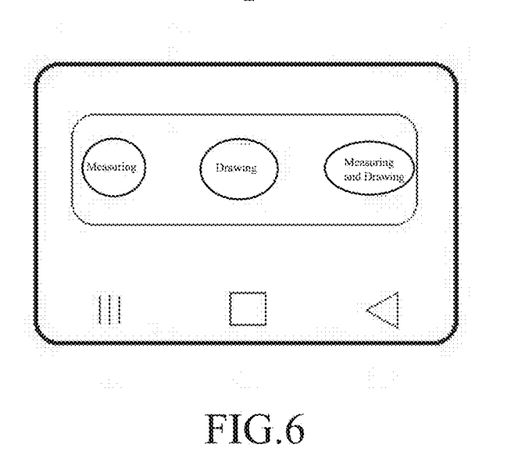
FIG. 6 illustrates an interface of a remote control touch screen of a preferred embodiment in the present disclosure.
Figure 7:
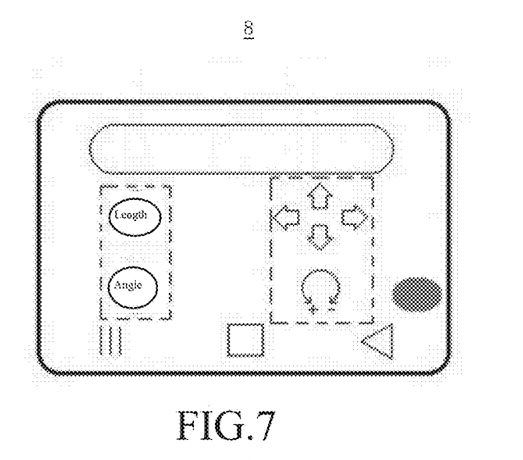
FIG. 7 illustrates a measuring interface of the remote control touch screen of a preferred embodiment in the present disclosure.

1. Measuring length: the remote control touch screen 8 is turned on to display an interface as shown in FIG. 6. An icon illustrated as "Measuring" is selected to enter a measuring interface as shown in FIG. 7. An icon illustrated as "Length" is selected to turn on the first laser generator 51 and the second laser generator 52 in a remote control manner. The light spot of the first laser generator 51 is aligned with the light spot of the second laser generator 52 to turn on the distance measuring sensor 6, and the distance measuring sensor 6 transmits measured data to the remote control touch screen 8. The measured data is stored in and displayed on the remote control touch screen 8.

2. Measuring angle: an icon illustrated as "Angle" is selected on the measuring interface as shown in FIG. 7, and the light spot of the first laser generator 51 is aligned with a vertex of an angle. The first motor and the second motor 31 are remotely controlled to move up, down, left, and right on the measuring interface as shown in FIG. 7. The light spot of the second laser generator 52 is aligned with one side of the angle for the first time before pushing a confirming button for the first time, and the light spot of the second laser generator 52 is aligned with the other side of the angle for the second time before pushing the confirming button for the second time. The angle sensor 7 transmits measured data to the remote control touch screen 8, and the measured data is stored in and displayed on the remote control touch screen 8.

Figure 8:
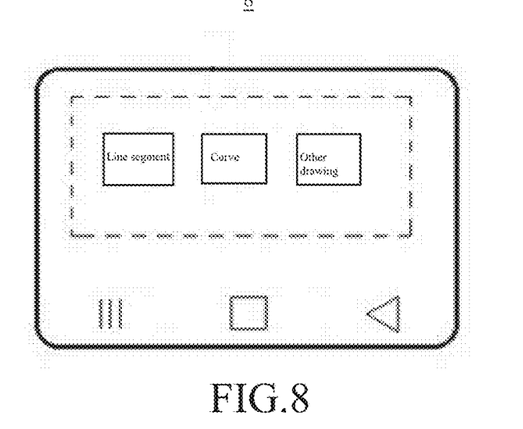
FIG. 8 illustrates a drawing interface of the remote control touch screen of a preferred embodiment in the present disclosure.

3. Drawing line segment: an icon illustrated as "Drawing" is selected on the interface illustrated in FIG. 6 to enter a drawing interface as illustrated in FIG. 8. An icon illustrated as "Line segment" is selected, the light spot of the first laser generator 51 is made to be aligned to a first end point, and the light spot of the second laser generator 52 is remotely made to be aligned to a second end point. After confirming, the electromagnet controls the drawing point of the drawing member 4 to descend to contact with a paper surface, the first motor and the second motor 31 work synchronously to enable the drawing point to move to draw a line segment to connect the first end point to the second end point.

Figure 9:
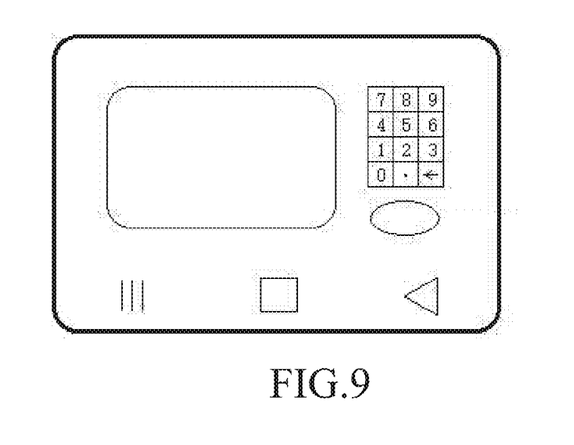
FIG. 9 illustrates a drawing parameters-setting interface of the remote control touch screen of a preferred embodiment in the present disclosure.

4. Drawing curve: in the drawing interface illustrated in FIG. 8, an icon illustrated as "Curve" is selected to enter a drawing parameters-setting interface as illustrated in FIG. 9. A radius value and an angle value (0-360°) are input on the drawing parameters-setting interface illustrated in FIG. 9, and the light spot of the first laser generator 51 is aligned with a circle center. After confirmation, the second motor 31 works to move the drawing point to a radius position, the electromagnet controls the drawing point of the drawing member 4 to descend, and the first motor is operated to rotate to move the drawing point to draw a curve.

Figure 10:
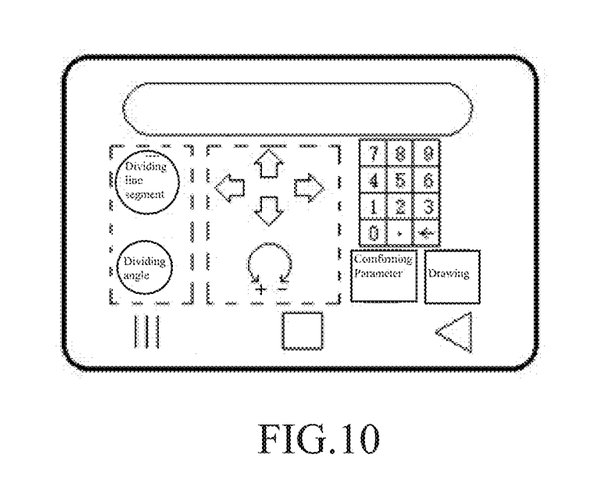
FIG. 10 illustrates a measuring and drawing interface of the remote control touch screen of a preferred embodiment in the present disclosure.

5. Multiple equal divisions of angle: an icon illustrated as "Measuring and Drawing" is selected on the interface illustrated in FIG. 6 to enter a measuring and drawing interface as illustrated in FIG. 10. An icon illustrated as "Dividing angle" is selected. The light spot of the first laser generator 51 is aligned with a vertex of an angle, and the number of parts to be equally divided is input on the operation interface and determined. The light spot of the second laser generator 52 is remotely controlled to fall on one side of the angle before confirming, and the light spot of the second laser generator 52 is remotely controlled to fall on the other side of the angle before confirming. The angle sensor 7 returns an angle value, and the control module calculates an average value of the angle value. The first motor works to make the rotating arm 22 rotate and move to a corresponding position, and the drawing point descends. The first motor and the second motor 31 work simultaneously to enable the drawing point to move to be connected to the vertex of the angle, and the drawing point continues to operate to finish the multiple equal divisions of the angle.

6. Multiple equal divisions of line segment: an icon illustrated as "Dividing line segment" is selected on the measuring and drawing interface illustrated in FIG. 10. The light spot of the first laser generator 51 is aligned with one end point of a line segment, and the number of parts to be equally divided is input on the operation interface and determined. The light spot of the second laser generator 52 is remotely controlled to fall on the other end point of the line segment. After confirming, the distance measuring sensor 6 returns a length value. After the control module calculates an average value of the length value, the second motor 31 works to move the drawing member 4 to a corresponding position, the drawing point descends, and the drawing point continues to operate to finish the multiple equal divisions of the line segment.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A measuring and drawing device, comprising:
   a supporting frame,
   a rotation driving portion,
   a reciprocation driving portion,
   a drawing member,
   a first laser generator,
   a second laser generator,
   a distance measuring sensor,
   an angle sensor, and
   a control module, wherein:
      the rotation driving portion comprises a first motor and a rotating arm,
      the first motor is disposed on the supporting frame,
      the first motor is configured to drive the rotating arm to rotate relative to the supporting frame,
      the reciprocation driving portion is disposed on the rotating arm and comprises a second motor and a belt gear pair,
      the second motor is operatively coupled to a gear belt of the belt gear pair,
      the drawing member is disposed on the gear belt and is configured to reciprocate along a length direction of the rotating arm,
      a drawing point of the drawing member is retractable, the first laser generator is disposed at a center of an axis of an output shaft of the first motor, the second laser generator is disposed on the drawing member, the distance measuring sensor is fixedly disposed relative to the output shaft of the first motor and is configured to measure a distance between the output shaft of the first motor and the drawing member, the angle sensor comprises an emitter and a receiver, the emitter is disposed on the rotating arm, the receiver is fixedly disposed relative to the output shaft of the first motor and is configured to sense a rotating angle of the rotating arm, each of the distance measuring sensor and the angle sensor is connected to the control module, the control module is connected to and is configured to control each of the first motor, the second motor, the first laser generator, and the second laser generator, the control module is configured to control the drawing point of the drawing member to extend out of or retract back into the drawing member through an electromagnet, the control module is configured to control each of the first laser generator and the second laser generator to emit a light spot and control the first motor and second motor to work, and when a position of the light spot of the second laser generator is confirmed:

the measuring and drawing device is configured to perform distance measuring through the distance measuring sensor and perform angle sensing through the angle sensor, and the drawing point of the drawing member is configured to be controlled to extend out of the drawing member to perform drawing of a straight line and a curve.

2. The measuring and drawing device according to claim 1, wherein:

the supporting frame comprises a mounting seat and at least three supporting legs configured to be accommodated in the mounting seat in a retractable manner.

3. The measuring and drawing device according to claim 1, wherein:

the rotating arm is detachable relative to the output shaft of the first motor.

4. The measuring and drawing device according to claim 1, wherein:

the reciprocation driving portion further comprises a guiding mechanism, the guiding mechanism comprises a guiding gear and a rack, the rack is disposed on the rotating arm along the length direction of the rotating arm, the guiding gear is disposed on the drawing member, and the guiding gear is configured to move on the rack.

5. The measuring and drawing device according to claim 1, wherein:

the belt gear pair comprises a driving gear and a driven gear which are disposed at two ends of the rotating arm, the gear belt is tensioned between the driving gear and the driven gear, and the second motor is connected to the driving gear to drive the driven gear.

6. The measuring and drawing device according to claim 1, comprising:

a remote control touch screen, wherein the remote control touch screen is in wireless communication with the control module.

7. The measuring and drawing device according to claim 6, wherein:

the remote control touch screen is a mobile phone or a tablet.

8. The measuring and drawing device according to claim 7, wherein:

the remote control touch screen is in wireless communication with the control module through Bluetooth or WiFi.

9. The measuring and drawing device according to claim 6, wherein:

the remote control touch screen is in wireless communication with the control module through Bluetooth or WiFi.

* * * * *